Figure 1:
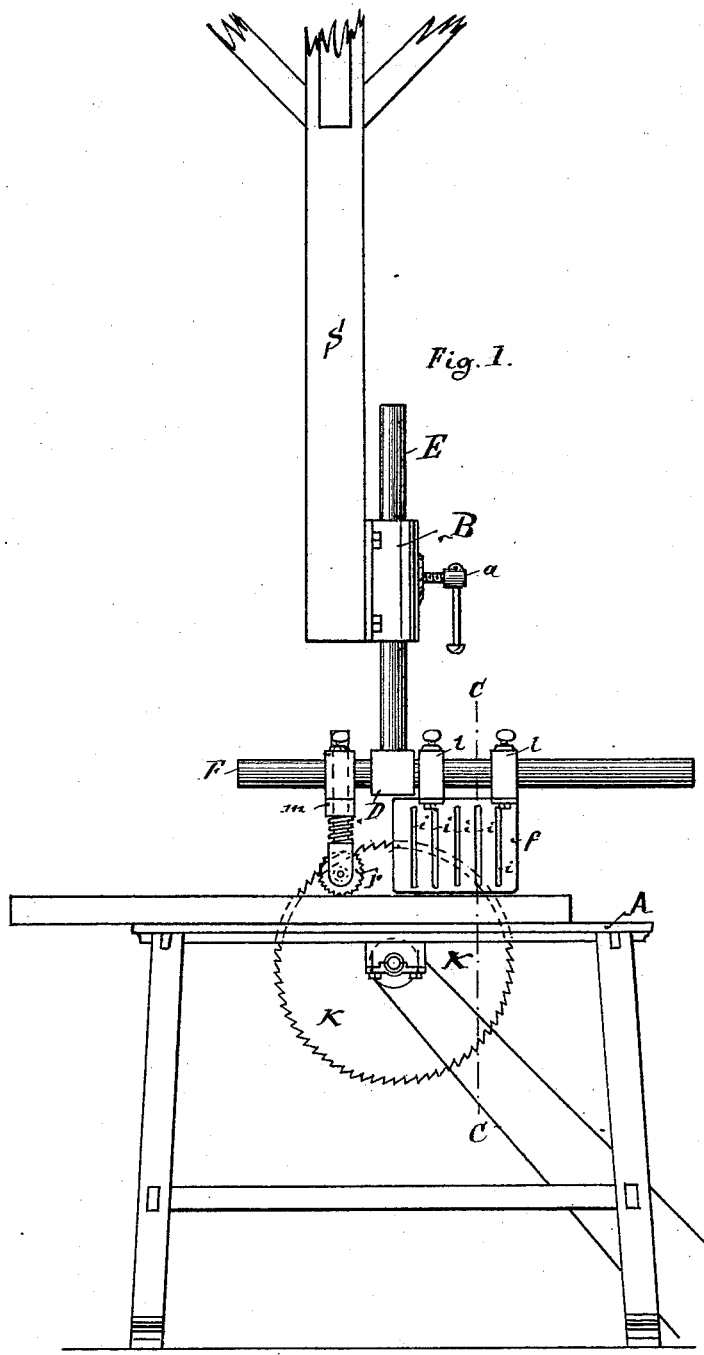

(No Model.) 3 Sheets—Sheet 1.

A. H. GRETSCHEL.
SAW GUARD.

No. 285,407. Patented Sept. 25, 1883.

Witnesses
Inventor
Alfred H. Gretschel
per Henry E. Roeder
Attorney (No Model.) 3 Sheets—Sheet 2.
A. H. GRETSCHEL.
SAW GUARD.
No. 285,407. Patented Sept. 25, 1883.
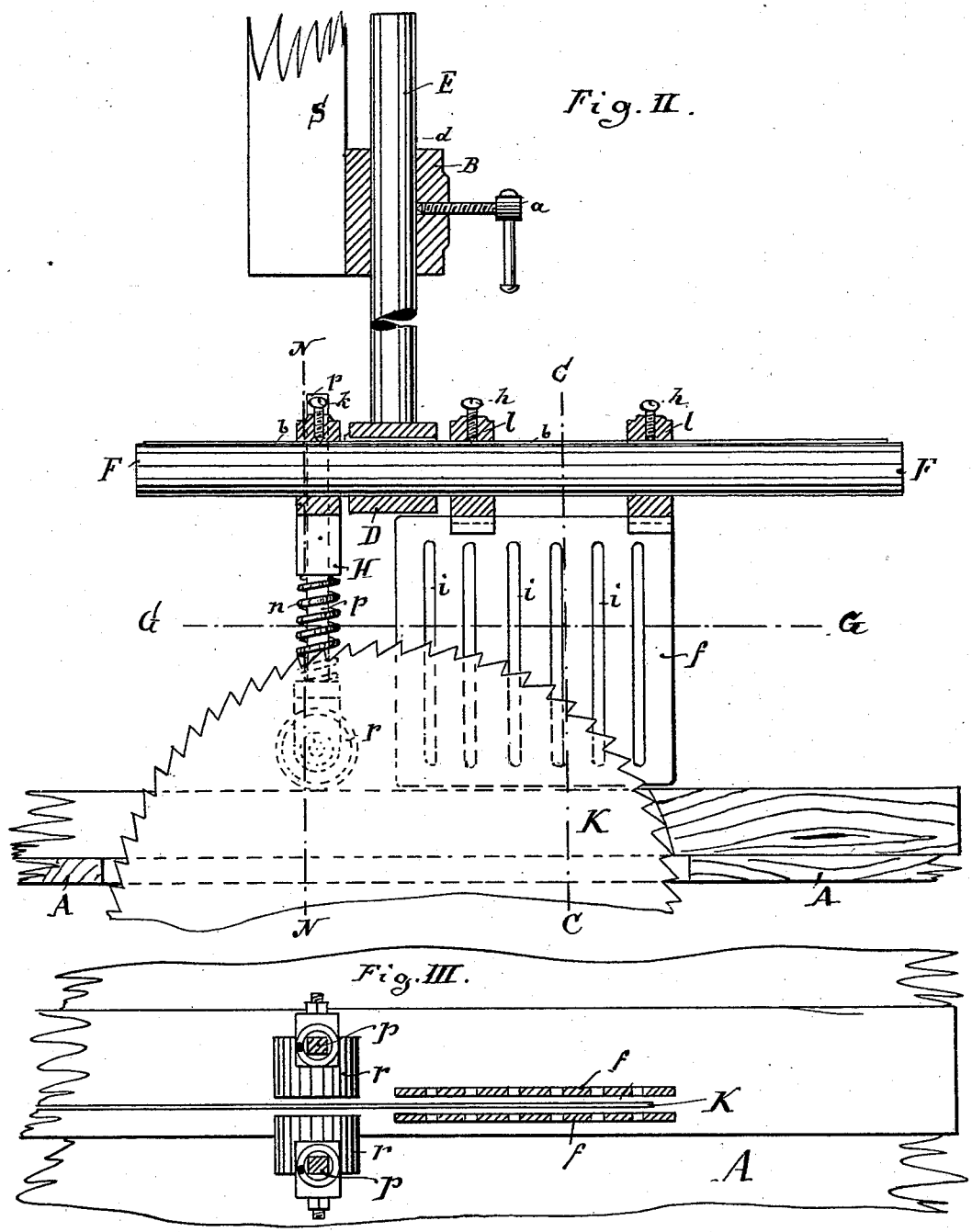

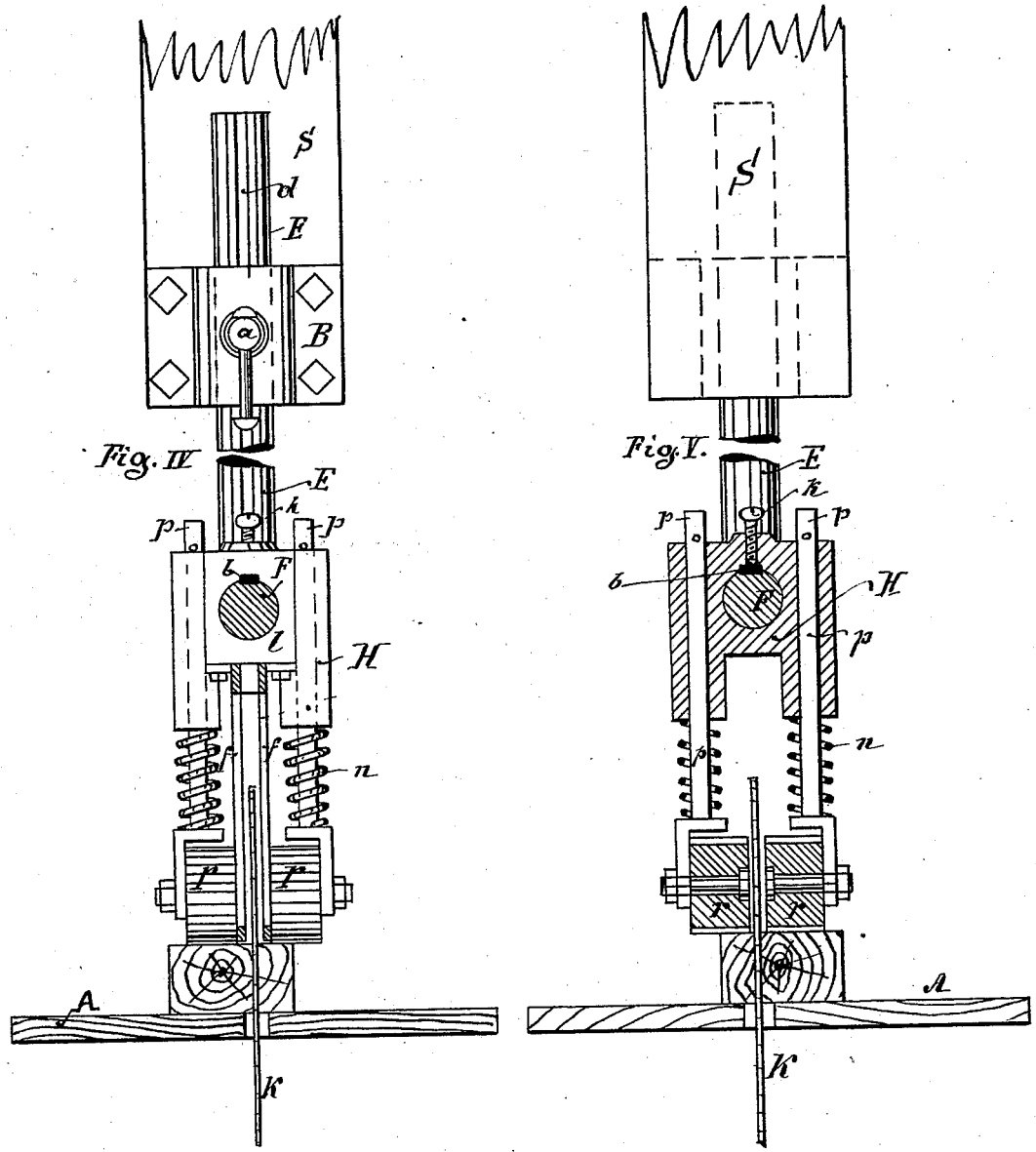

UNITED STATES PATENT OFFICE.

ALFRED HERMANN GRETSCHEL, OF LEIPSIC, GERMANY.

SAW-GUARD.

SPECIFICATION forming part of Letters Patent No. 285,407, dated September 25, 1883.

Application filed September 27, 1882. (No model.)

*To all whom it may concern:*

Be it known that I, ALFRED HERMANN GRETSCHEL, a citizen of Germany, residing in Leipsic, in the Empire of Germany, have invented a new and useful Safety-Guard for Circular Saws, of which the following is a specification.

In the operation of circular saws is, first, the danger at the front of the saw of the hand of the workman coming in contact with the saw; and, secondly, the tendency of the wood operated upon moving upward at the back of the saw, which is likely to produce a detrimental vibration to the saw-blade, affecting the forward edge of the same and causing many of the accidents. To obviate these difficulties and to prevent all danger resulting in this manner is the nature of my invention.

In the accompanying drawings, Figure I represents a general view of a circular saw with my improvement attached. Fig. II represents part of a circular saw with my improved safety-guard on an enlarged scale. Fig. III is a horizontal section at line G G, Fig. II. Fig. IV is a vertical section at line N N, Fig. II; and Fig. V is a vertical section at line C C, Fig. II.

Similar letters represent similar parts in all the figures.

K represents the circular saw, attached to a suitable table, A, in the usual manner. Above the saw a support, S, is arranged, attached and suspended from the roof of the building in any convenient manner. At the lower end of this support S a block, B, is attached, through which a rod, E, passes, capable of being moved upward or downward, and situated directly over the center of the circular saw K. This rod E is provided with a key or feather, $d$, and held in any desired position by means of the screw-bolt $a$. Through an eye, D, at the lower end of the rod E a bar, F, is attached parallel with the circular saw. Forward of the eye D, near the front of the saw, two or more hubs or blocks, $l\ l$, are placed upon this bar F, moving on a suitable key, $b$, in the bar F, and fixed in any desired position through the screws $h$. To these blocks $l\ l$ plates or guards $f f$ are firmly attached, running on each side of the circular saw and extending a little forward of the front edge of the saw. By these plates or guards $f f$ all danger will be prevented of the front edge of the saw coming in contact with the hands or any other part of the body of the workman. The guards $f f$ have vertical or other suitable openings, $i\ i$, made in their surface, to allow the escape of the sawdust or shavings through the same. Behind the eye D and back of the center of the circular saw a block, H, is arranged to slide on the bar F, and capable of being fixed in any desired position by means of the screw $k$. Through this block H two bars or rods, $p\ p$, are made to slide, one on each side of the bar F, and consequently on each side of the circular saw, carrying at their lower ends rollers $r\ r$, acted upon by suitable springs, $n\ n$, so as to force said rollers $r\ r$ to bear upon the upper side of the wood operated upon, and prevent thereby the moving or springing upward of the material.

What I claim as my invention, and desire to secure by Letters Patent, is—

In combination with a circular saw, the side plates or guards, $f f$, with suitable openings, $i\ i$, near the front of the circular saw, and the spring-rods $p\ p$, with rollers $r\ r$ behind the center of the circular saw, said guards $f f$ and rods $p\ p$ being attached to suitable hubs sliding on a horizontal bar, F, supported by a vertical bar, E, the whole being arranged to operate in the manner and for the purpose substantially as herein described.

ALFRED HERMANN GRETSCHEL.

Witnesses:
JULIUS ALBERT DORING,
HRM. LEITERT.